(12) United States Patent
Laird et al.

(10) Patent No.: US 10,389,180 B2
(45) Date of Patent: Aug. 20, 2019

(54) INDUCTIVE CHARGING STATION FOR AN ELECTRONIC DEVICE

(71) Applicant: FORD GLOBAL TECHNOLOGIES, LLC, Dearborn, MI (US)

(72) Inventors: Kenneth S. Laird, Canton, MI (US); Anthony Ligi, Jr., Chelsea, MI (US); Kenneth Alan Stoner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/701,472

(22) Filed: Sep. 12, 2017

(65) Prior Publication Data
US 2019/0081508 A1   Mar. 14, 2019

(51) Int. Cl.
| | | |
|---|---|---|
| *H02J 7/00* | (2006.01) | |
| *H02J 50/10* | (2016.01) | |
| *H02J 7/02* | (2016.01) | |
| *H04B 5/00* | (2006.01) | |

(52) U.S. Cl.
CPC ............ *H02J 50/10* (2016.02); *H02J 7/0027* (2013.01); *H02J 7/0044* (2013.01); *H02J 7/025* (2013.01); *H04B 5/0037* (2013.01)

(58) Field of Classification Search
CPC .............................. H02J 7/0027; H02J 7/0042
USPC .................................................. 320/108, 115
See application file for complete search history.

(56) References Cited

U.S. PATENT DOCUMENTS

| | | |
|---|---|---|
| 5,832,082 A | 11/1998 | Nagai |
| 6,002,765 A | 12/1999 | Frank |
| 6,053,759 A | 4/2000 | Kunert |
| 6,973,291 B1 | 12/2005 | Bellows |
| 8,202,114 B2 | 6/2012 | Zilmer et al. |
| 9,148,033 B2 | 9/2015 | Van Wiemeersch |
| 9,577,467 B1 * | 2/2017 | Karanikos ............... H02J 7/025 |
| 2008/0298026 A1 | 12/2008 | Wang et al. |
| 2015/0020715 A1 * | 1/2015 | Pajic ................ B64D 11/00152 108/3 |
| 2016/0359356 A1 * | 12/2016 | Song ..................... H02J 7/0044 |

\* cited by examiner

*Primary Examiner* — Edward Tso
*Assistant Examiner* — Aaron Piggush
(74) *Attorney, Agent, or Firm* — Vichit Chea; King & Schickli, PLLC

(57) ABSTRACT

An inductive charging station is provided for an electronic device. The inductive charging station includes a housing, an inductive charging feature and a device latch that is carried on the housing. The device latch is displaceable between a charging position wherein the electronic device is held in position for efficient charging, and a presenting position wherein the electronic device is tilted forward for easy access and removal from the inductive charging station.

11 Claims, 9 Drawing Sheets

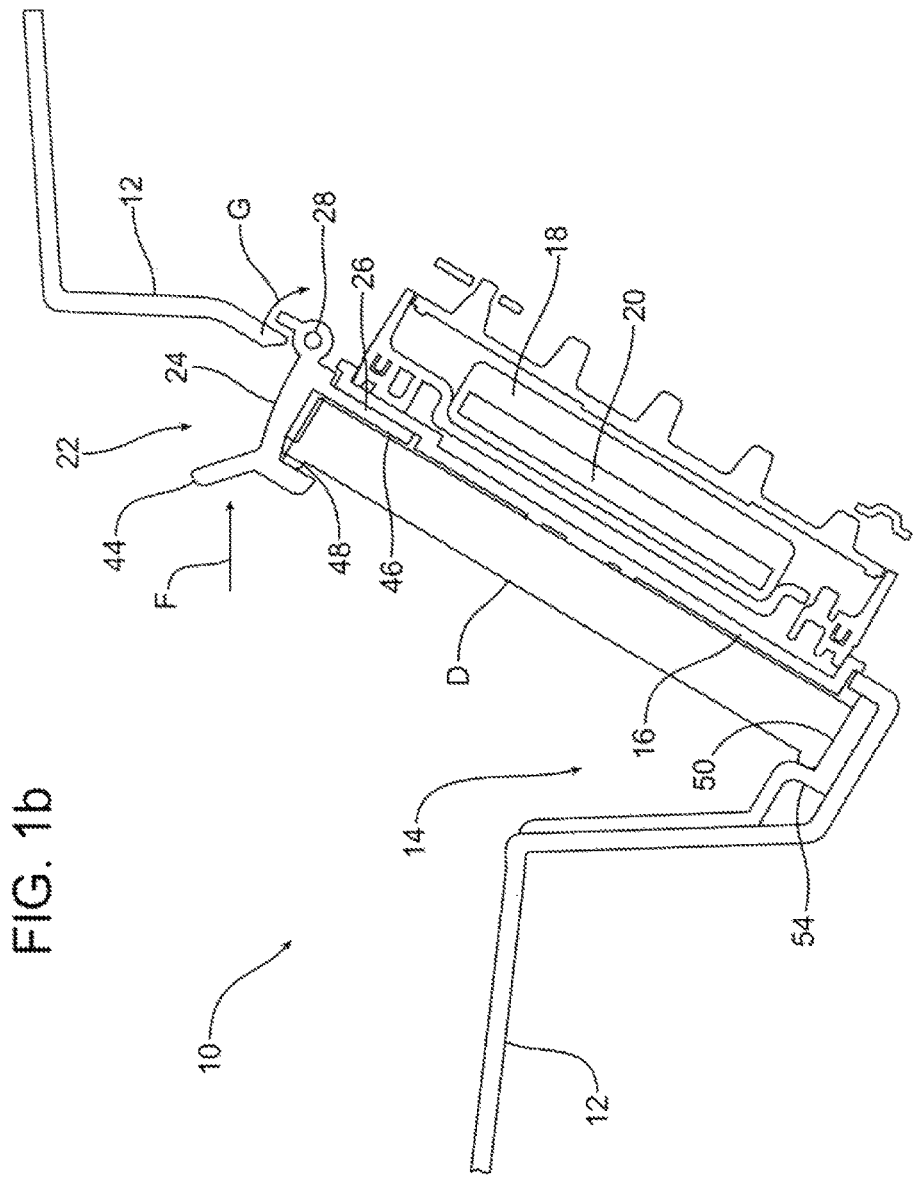

INDUCTIVE CHARGING STATION FOR AN ELECTRONIC DEVICE

TECHNICAL FIELD

This document relates generally to the motor vehicle equipment field and, more particularly, to an inductive charging station for an electronic device adapted for use in a motor vehicle.

BACKGROUND

Portable electronic devices, such as cell phones and smart phones, employ rechargeable batteries that must be recharged when battery charge is consumed. Toward this end, wireless charging devices, such as inductive chargers are available to charge the rechargeable batteries without any physical wire connection between the electronic device and the charging device. Such wireless chargers generate an electromagnetic field through the use of electromagnetic transducers and transfer electric energy from the charging device to a receiver in the electronic device.

Inductive chargers of this type require the electronic device to be properly aligned and held as close as possible to the inductive charging device in order to efficiently charge the electronic device. This can be problematic where electronic devices come in different shapes and sizes and acceleration forces, deceleration forces and lateral cornering forces are applied to the electronic device during operation of the motor vehicle.

This document relates to a new and improved inductive charging station for an electronic device that more efficiently and effectively holds the electronic device in a desired position for the most efficient charging while also presenting the device to the operator, thereby allowing one to easily remove the electronic device from the inductive charging station for use.

SUMMARY

In accordance with the purposes and benefits described herein, an inductive charging station is provided for an electronic device. That inductive charging station comprises a housing, an inductive charging feature adjacent the housing and a device latch carried on the housing. The device latch is displaceable between a charging position and a presenting position for the electronic device.

The device latch may be an overcenter latching mechanism. The device latch may include an adjustable cradle to accommodate different sizes of electronic devices. Further, the device latch may include a pivot element.

The adjustable cradle may be displaceable along the pivot element between multiple operating positions. A pivot pin may pivotally connect the pivot element to the housing. That pivot element may include a first rack. The adjustable cradle may include a second rack. The first rack and the second rack are engaged together in order to hold the adjustable cradle in a selected operating position on the pivot element.

A spring clip may be carried on the adjustable cradle. The spring clip may bias the first rack and the second rack into engagement. Further, the adjustable cradle may include a guide slot and the pivot element may extend through that guide slot. In addition, the adjustable cradle may include a lift lever.

The housing may include a tray or support surface for the electronic device. The device latch functions to hold the electronic device against the support surface when in the charging position. Thus, acceleration, deceleration and cornering forces generated during operation of the motor vehicle are prevented from shifting the position of the electronic device with respect to the inductive charging station so that efficient charging is maintained at all times.

In one particularly useful embodiment, the inductive charging feature is carried on the housing juxtaposed to the support surface. In some embodiments, the housing may include an electronic device pocket. In such embodiments, the device latch and the electronic device pocket may be provided at opposite sides of the support surface.

The adjustable cradle may include a presentation lever. The presentation lever functions to tilt the electronic device away from the support surface and forward in the electronic device pocket when in the presenting position. In this position, the electronic device is readily accessible to be grasped and removed from the inductive charging station for use by the user.

The adjustable cradle may further include a first channel and the electronic device pocket may include a second channel. The first channel opens toward the second channel and the second channel opens toward the first channel when the device latch is in the charging position. Thus, it should be appreciated that the electronic device is squeezed between the first channel of the adjustable cradle and the second channel of the electronic device pocket and held in position over the support surface of the charging station for most efficient charging under substantially any foreseeable operating conditions.

The first channel may be offset from the pivot pin that connects the pivot element of the device latch to the housing. The presentation lever of the adjustable cradle may form one wall of the first channel. Further, in at least some of the many possible embodiments, the lift lever may be provided on a first side of the first channel while the presentation lever is provided on a second side of the first channel. Still further, in some embodiments a resilient pad may be provided lining a bottom wall of the first channel. Such a pad accommodates and better grips the electronic device to hold the electronic device in position without slipping.

In the following description, there are shown and described several preferred embodiments of the inductive charging station. As it should be realized, the inductive charging station is capable of other, different embodiments and its several details are capable of modification in various, obvious aspects all without departing from the inductive charging station as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of inductive charging station and together with the description serve to explain certain principles thereof.

FIG. 1b is a schematic side elevational view also illustrating the device latch and electronic device in the charging position.

Figure 3A:
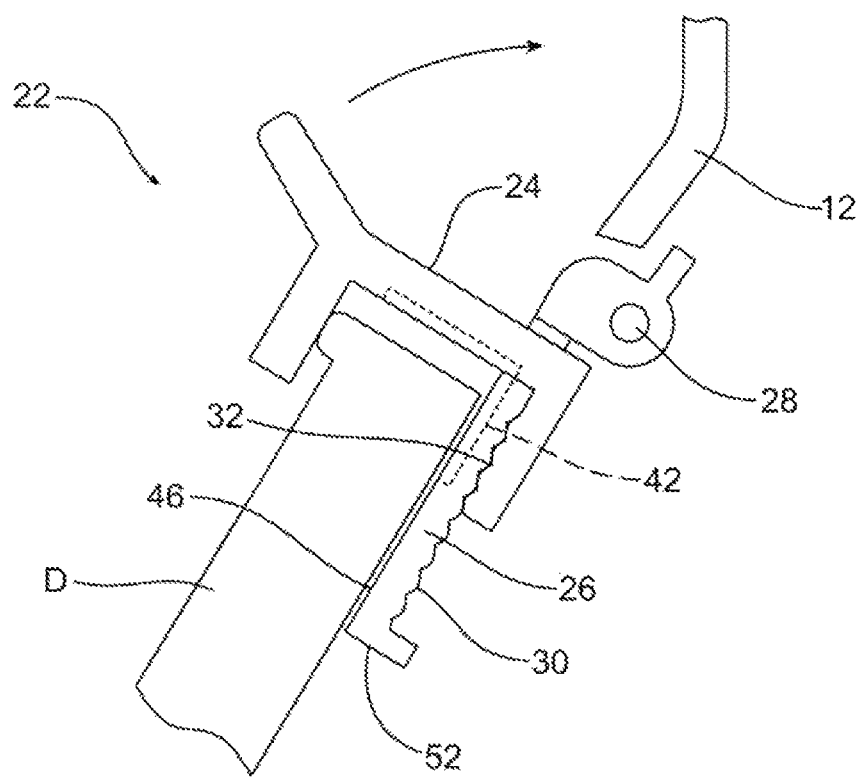
Figure 3B:
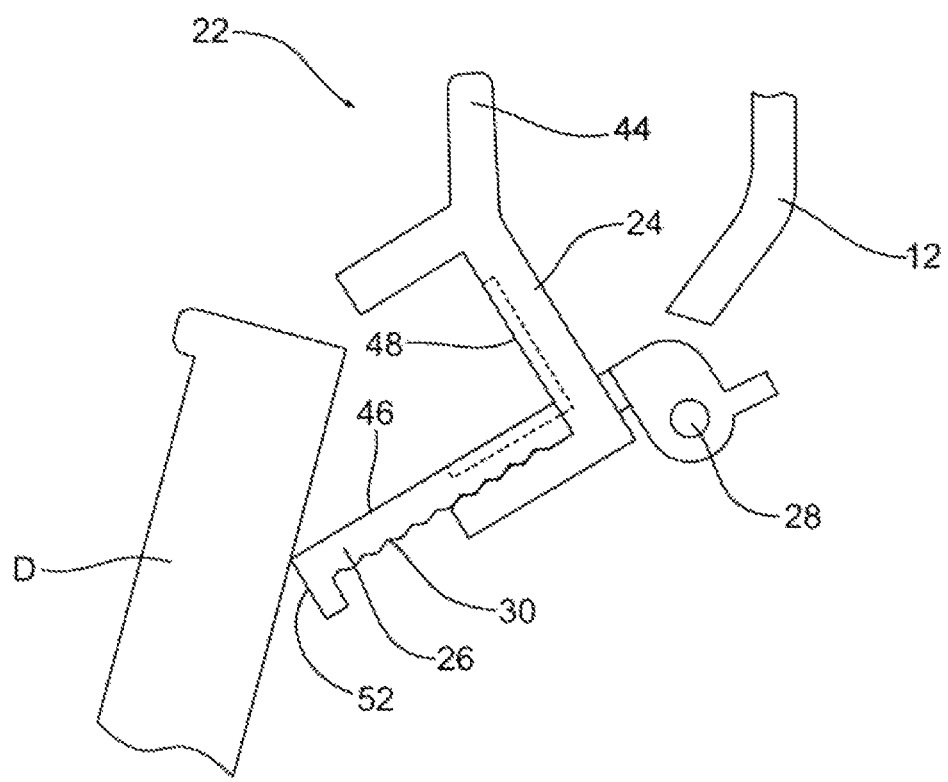

FIGS. 3a and 3b illustrate the adjustable cradle in a first adjusted operating position. FIG. 3a illustrates the adjustable cradle and electronic device in the charging position. FIG. 3b illustrates the adjustable cradle and electronic device in the presenting position.

Figure 4A:
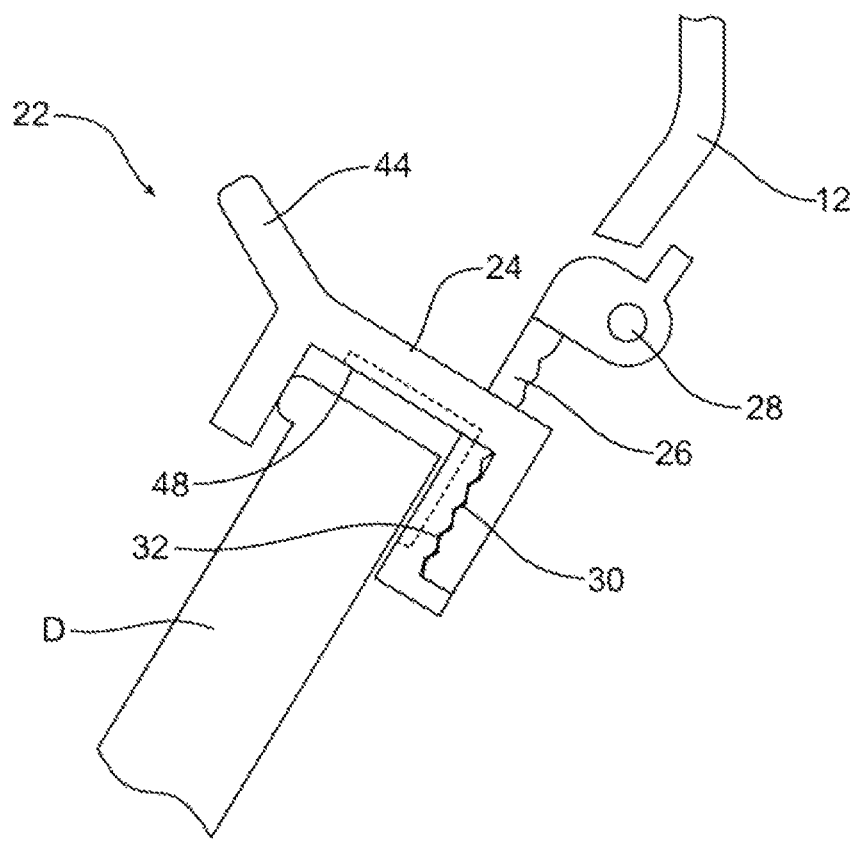
Figure 4B:
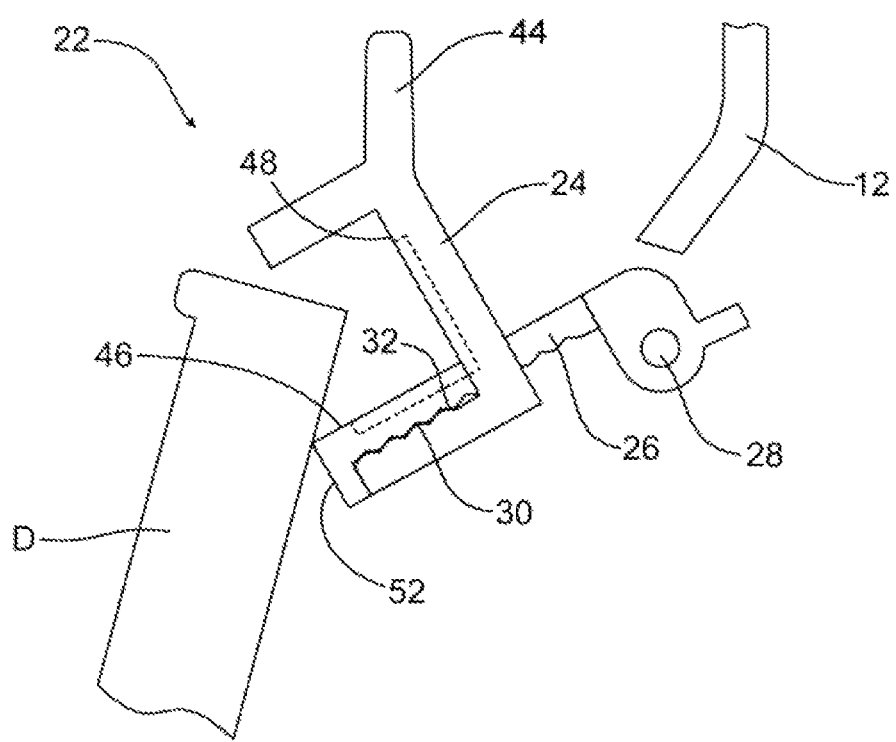

FIGS. 4a and 4b are views similar to FIGS. 3a and 3b but illustrating the adjustable cradle in a second adjusted operating position. In FIG. 4a, the adjustable cradle and electronic device are in the charging position. In FIG. 4b, the adjustable cradle and electronic device are in the presentation position.

Figure 5A:
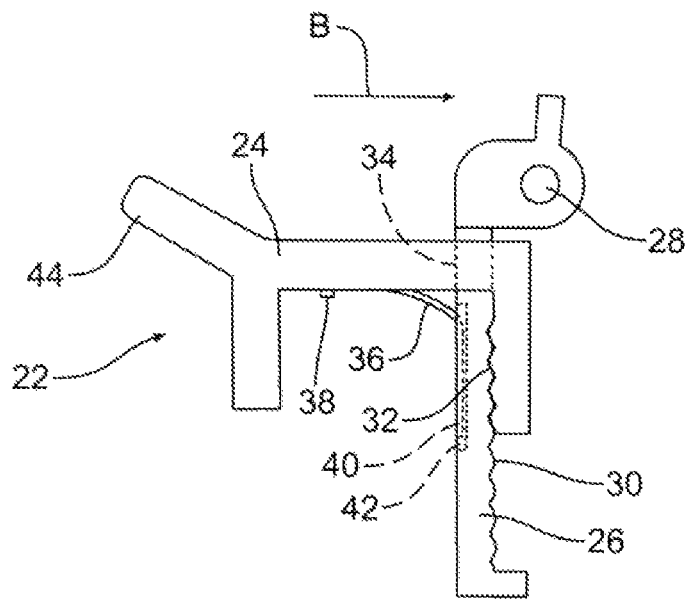
Figure 5B:
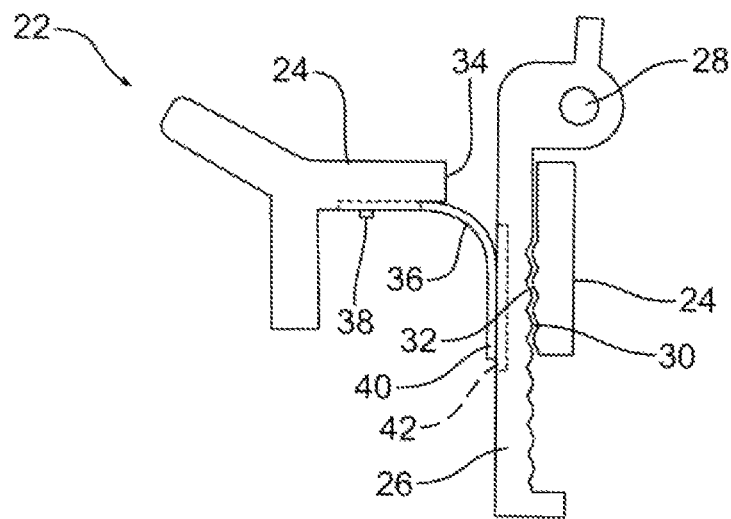

FIGS. 5a and 5b are schematic elevational views illustrating details of the structure of the device latch including, particularly, the spring clip carried on the adjustable cradle that functions to bias the first rack on the pivot element into engagement with the second rack on the adjustable cradle in order to hold the device latch in a desired adjusted operating position.

Reference will now be made in detail to the present preferred embodiments of the inductive charging station, examples of which are illustrated in the accompanying drawing figures.

DETAILED DESCRIPTION

Reference is now made to the drawing FIGS. 1a, 1b, 2a, 2b that illustrate the new and improved inductive charging station 10. As illustrated, the inductive charging station 10 includes a housing 12. In the illustrated embodiment the housing 12 includes an electronic device pocket generally designated by reference numeral 14. In addition, the housing 12 includes a tray or support surface 16 extending upward from the electronic device pocket 14. An inductive charging feature 18 is carried on the housing 12 immediately behind the support surface 16. That inductive charging feature 18 may comprise an induction coil 20 to provide an inductive coupling with an electronic device D held against the support surface 16. In this way it is possible for the inductive charging feature 18 to provide a wireless charge to the electronic device D in a manner known in the art.

As illustrated I FIGS. 1a, 1b, 2a, 2b the inductive charging station 10 also includes a device latch 22 that is carried on the housing 12. The device latch 22 is displaceable between a charging position, illustrated in FIGS. 1a and 1b, wherein the electronic device D is held against the support surface 16 aligned with the inductive charging feature 18 carried on the housing 12 juxtaposed to that support surface. When the device latch 22 is in the charging position illustrated in FIGS. 1a and 1b, the electronic device D is held in the best possible position with respect to the inductive charging feature 18 so as to allow for the most efficient wireless charging of the rechargeable battery (not shown) of the electronic device.

Figure 1A:
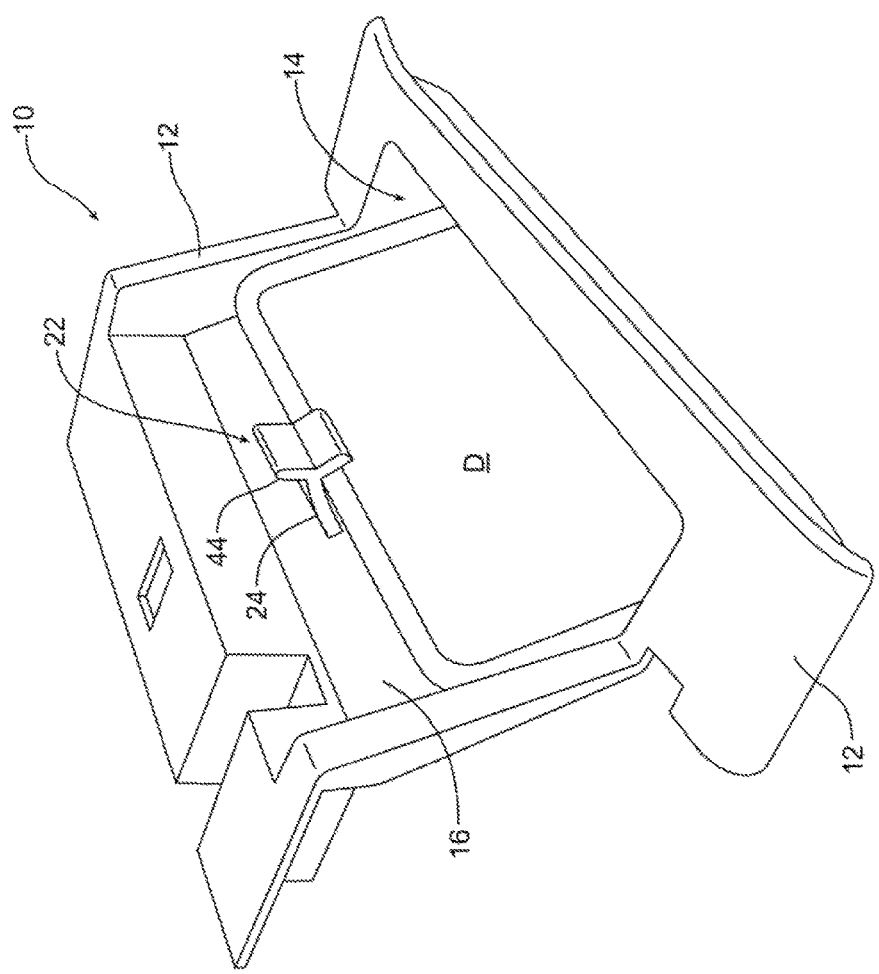
FIG. 1a is a perspective view of inductive charging station illustrating the device latch securing an electronic device in a charging position.
Figure 2A:
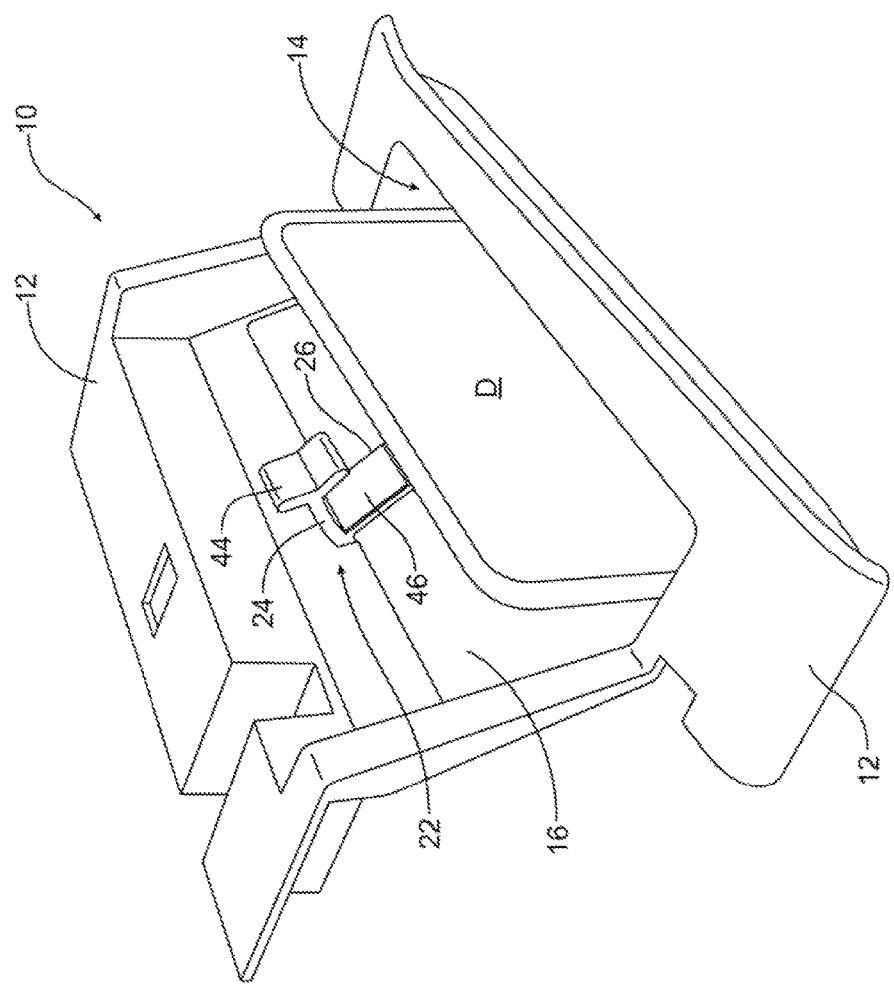
FIG. 2a is a perspective view illustrating the inductive charging station with the device latch in the presenting position wherein the presentation lever holds the electronic device away from the support surface and forward in the electronic device pocket so that the electronic device may be easily accessed and removed from that pocket for use.
Figure 2B:
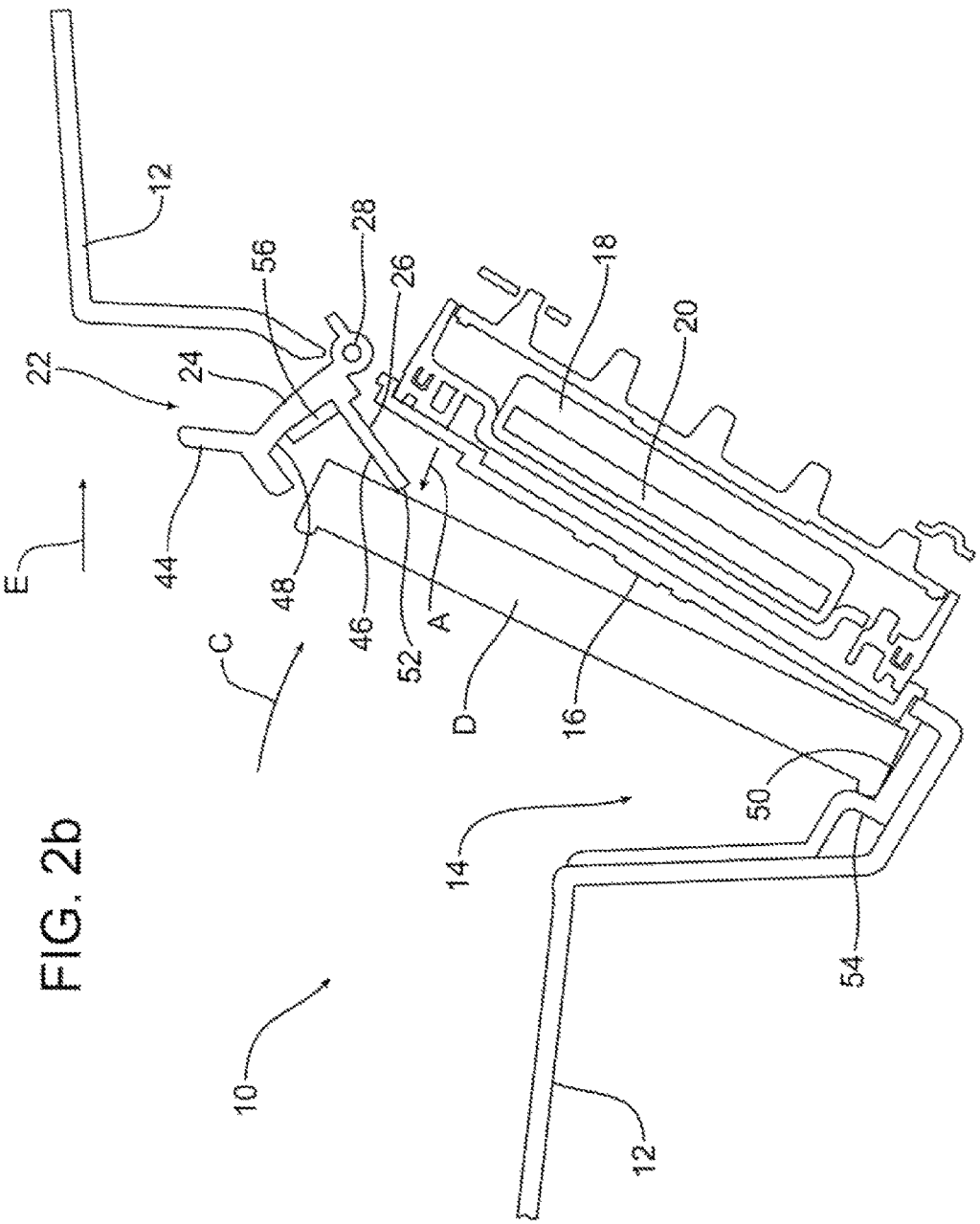
FIG. 2b is a schematic side elevational view illustrating the inductive charging station and, more particularly, the device latch in the presenting position.

When the device latch 22 is in the presenting position illustrated in FIGS. 2a and 2b, the electronic device D is tilted away from the support surface 16 and forward in the electronic device pocket 14 (note action arrows A) so that the electronic device may be easily accessed and grabbed by an operator and removed for use. As should be appreciated from reviewing drawing FIGS. 1a, 1b, 2a and 2b, the device latch 22 in the illustrated embodiment is an overcenter latching mechanism. Thus, the device latch 22 tends to hold the electronic device D in the charging position illustrated in FIGS. 1 and 1b or the presenting position illustrated in FIGS. 1a and 1b or the presenting position illustrated in FIGS. 2a and 2b depending upon the desires of the operator.

As best illustrated in FIGS. 3a, 3b, 4a, 4b, the device latch 22 may include an adjustable cradle 24 in order to accommodate different sizes of electronic devices D. Further, the device latch 22 may include a pivot element 26. As should be appreciated from viewing 3a and 3b, and 4a and 4b, the adjustable cradle 24 is displaceable along the pivot element 26 between multiple adjusted operating positions in order to accommodate and securely hold electronic devices D of differing size and shape.

A pivot pin 28 pivotally connects the pivot element 26 to the housing 12. As also illustrated, the pivot element 26 includes a first rack 30. The adjustable cradle 24 includes a second rack 32. The first rack 30 and the second rack 32 include meshing teeth that allow for relative adjustment of the position of the adjustable cradle 24 on the pivot element 26 in a manner that will be described in greater detail below.

As best illustrated in FIGS. 5a and 5b, the adjustable cradle 24 includes a guide slot 34. The pivot element 26 extends through the guide slot 34. A spring clip 36 is secured by a heat stake 38 to the adjustable cradle 24. The distal end 40 of the spring clip 36 is engaged in a cavity or channel 42 on the face of the pivot element 26 opposite the first rack 30. Thus, it should be appreciated that the spring clip 36 functions to bias the first rack 30 on the pivot element 26 into meshing engagement with the second rack 32 on the adjustable cradle 24. Accordingly, the biasing force provided by the spring clip 36 functions to hold the adjustable cradle 24 in any desired and set or adjusted operating position along the pivot element 26 selected by the user. The operating position selected is the one that is best suited to match the size and shape of the electronic device D so that the electronic device is firmly held in a charging position that allows for most efficient charging of the electronic device D through the induction charging feature 18.

Here it should be appreciated that one may adjust the position of the adjustable cradle 24 along the pivot element 26 by pressing the adjustable cradle in the direction of action arrow B (see FIG. 5a) against the force of the spring clip 36 and sliding the adjustable cradle over the pivot element 26. Once the desired position of the adjustable cradle 24 is attained, one releases the adjustable cradle and the spring clip 36 biases the adjustable cradle 24 with respect to the pivot element 26 to again engage the first rack 30 and second rack 32 in a meshed condition.

As further illustrated in the drawing Figures, the adjustable cradle 24 also includes a lift lever 44. The face of the pivot element 26 opposite the first rack 30 forms a presentation lever 46. Further, the adjustable cradle 24 includes a first channel 48. In the illustrated embodiment, the lift lever 44 is on a first side of the first channel 48 while the presentation lever 46 is on a second side of the first channel. Further, the presentation lever 46 forms one wall of the first channel 48. In addition, it should be appreciated that the first channel 48 is offset from the pivot pin 28.

As best illustrated in FIG. 1b, the electronic device pocket 14 includes a second channel 50. When the device latch 22 is in the charging position the first channel 48 in the adjustable cradle 24 opens toward the second channel 50 in the electronic device pocket 14 and the second channel opens toward the first channel. Thus as illustrated, a first edge $E_1$ of the electronic device D is captured in the first channel 48 of the adjustable cradle 24 while a second edge $E_2$ of the electronic device is captured in the second channel 50 of the electronic device pocket 14 when the device latch 22 is in the charging position. Thus, it should be appreciated that the electronic device D is squeezed between the adjustable cradle 24 and the device pocket 14 and held against the support surface 16 when in the charging position. This effectively aligns the electronic device D over the inductive charging feature 18 in a manner that allows for the most efficient and effective charging of the rechargeable batteries of the electronic device D. Further, it should be appreciated that the electronic device D is firmly held in this position against foreseeable acceleration, deceleration and cornering forces generated during operation of the motor vehicle.

When one wishes to use the inductive charging station 10, one inserts the electronic device D into the electronic device pocket 14 with the upper margin of the electronic device resting against the distal end 52 of the presentation lever 46 (note action arrow C in FIG. 2b). Next, one pushes the upper edge of the electronic device in the direction of action arrow E. This functions to pivot the device latch 22 overcenter about the pivot pin 28 snapping the device latch 22 into the charging position illustrated in FIG. 1b. Here, it should be noted how the first channel 48 of the adjustable cradle 24 and the second channel 50 in the electronic device pocket 14 are provided at opposite sides of the support surface 16 and function to hold the electronic device D tightly against the support surface 16 adjacent the inductive charging feature 18. Note particularly step 54 at the bottom of the electronic device pocket 14 that forms the front wall of the second channel 50.

When one wishes to release the electronic device D from the inductive charging station 10, one engages the lift lever 44 pressing in the direction of action arrow F (see FIG. 1b). This causes the device latch 22 to pivot about the pivot pin 28 in the direction of action arrow G. When this occurs, the presentation lever 46 engages the back of the electronic device D pushing the top margin of the electronic device away from the support surface 16. Accordingly, as illustrated in FIG. 2b, the electronic device D is tilted forward in the electronic device pocket 14 so it may be easily accessed by the user and removed from the inductive charging station 10 for use.

The foregoing has been presented for purposes of illustration and description. It is not intended to be exhaustive or to limit the embodiments to the precise form disclosed. Obvious modifications and variations are possible in light of the above teachings. For example, a resilient pad 56 may be provided to line the bottom wall of the first channel 48 (see FIG. 2b). That resilient pad 56 provides a non-skid surface for better gripping the side edge of the electronic device D and holding the electronic device in a charging position. All such modifications and variations are within the scope of the appended claims when interpreted in accordance with the breadth to which they are fairly, legally and equitably entitled.

What is claimed:

1. An inductive charging station for an electronic device, comprising:
   a housing;
   an inductive charging feature adjacent said housing; and
   a device latch carried on said housing and adapted to engage the electronic device, said device latch being displaceable between a charging position wherein the electronic device is oriented for charging by the inductive charging feature and a presenting position wherein the electronic device is oriented for access, and wherein said device latch is an overcenter latching mechanism and said device latch includes an adjustable cradle, a pivot element and a pivot pin pivotally connecting said pivot element to said housing, wherein said adjustable cradle is displaceable along said pivot element between multiple operating positions, wherein said pivot element includes a first rack, said adjustable cradle includes a second rack and a guide slot and said pivot element extends through said guide slot and wherein a spring clip carried on said adjustable cradle biases said first rack and said second rack into engagement.

2. The inductive charging station of claim 1, wherein said adjustable cradle includes a lift lever.

3. The inductive charging station of claim 2, wherein said housing includes a support surface for said electronic device, said device latch holding said electronic device against said support surface when in said charging position.

4. The inductive charging station of claim 3, wherein said inductive charging feature is carried on said housing juxtaposed said support surface.

5. The inductive charging station of claim 4, wherein said housing includes an electronic device pocket, said device latch and said electronic device pocket being provided at opposite sides of said support surface.

6. The inductive charging station of claim 5, wherein said pivot element is a presentation lever, said presentation lever tilting said electronic device away from said support surface and forward in said electronic device pocket when in said presenting position.

7. The inductive charging station of claim 6, wherein said adjustable cradle includes a first channel and said electronic device pocket includes a second channel, said first channel opening toward said second channel and said second channel opening toward said first channel when said device latch is in said charging position.

8. The inductive charging station of claim 7, wherein said first channel is offset from said pivot pin.

9. The inductive charging station of claim 8, wherein said presentation lever forms one wall of said first channel.

10. The inductive charging station of claim 9, wherein said lift lever is on a first side of said first channel and said presentation lever is on a second side of said first channel.

11. The inductive charging station of claim 10, further including a resilient pad lining a bottom wall of said first channel.

* * * * *